United States Patent Office 3,244,413
Patented Apr. 5, 1966

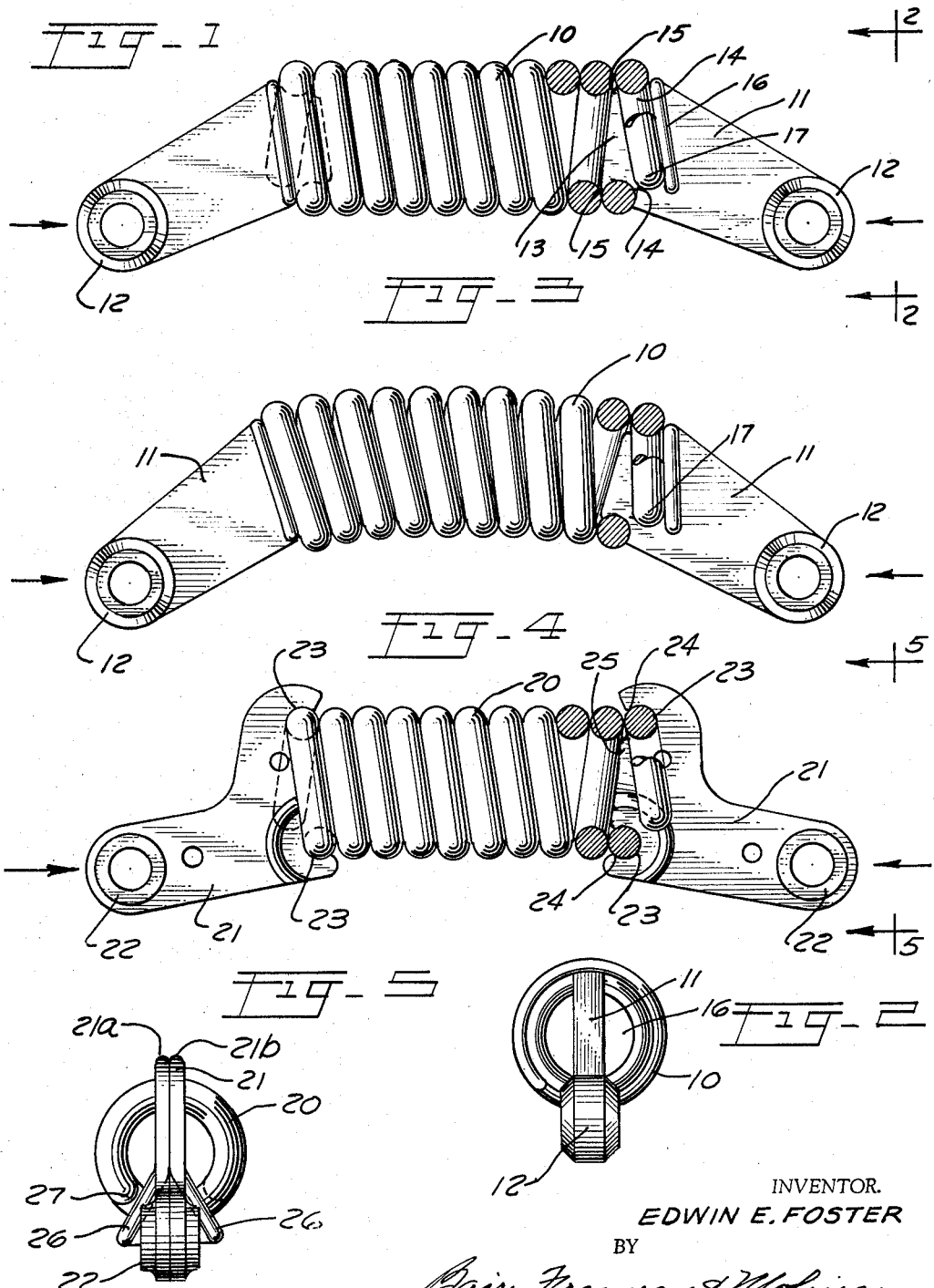

3,244,413
END CONNECTOR FOR COILED SPRINGS
Edwin E. Foster, Austin, Tex., assignor to Majik-Ironers, Inc., Austin, Tex., a corporation of Texas
Filed Dec. 30, 1963, Ser. No. 334,096
5 Claims. (Cl. 267—1)

This invention relates to an end connector for coiled springs and more particularly for compression loaded flexion springs of the type disclosed in my Patent No. Re. 23,974

In using flexing compression springs of the type disclosed in my reissue patent mentioned above, it has been found that when the spring wire from which the spring is formed is extended from the ends of the coil and formed into loops, the cost becomes prohibitive. To eliminate this expense it has been the common practice to use end fittings terminating in a tapered plug externally grooved to fit into the end of the spring.

Experience with such springs has shown that when the spring flexes it rubs against the small diameter end portion of the plug. In a relatively small number of operations this rubbing will wear the spring sufficiently to weaken it and in fact the existence of the friction itself will interfere with proper functioning of the spring. End fittings of this type have therefore not proved to be satisfactory.

It is accordingly one of the objects of the present invention to provide an end connector for coiled springs which securely grips the end turn or turns of the spring and clears the next adjacent turn in all positions of the spring to eliminate friction and wear.

Another object is to provide an end connector for coiled springs formed with a groove to receive tightly the end turn or turns of the coil with the end wall of the groove terminating in a relatively thin lip which clears the next adjacent turn of the coil.

According to a feature of the invention the groove may face axially to embrace the end turn of the coil over more than 180° of its circumference and will terminate in relatively thin lips which clear the next adjacent turn.

According to still another feature, the connector may be relatively flat with the groove being formed in its edge portions at one end thereof to grip the end turn of the coil at diametrically spaced points.

The above and other objects and features of the invention will be more readily apparent from the following description when read in connection with the accompanying drawing, in which:

FIGURE 1 is a side elevation with parts in section of a connector and coiled spring assembly embodying the invention;

FIGURE 2 is an end view on the line 2—2 of FIGURE 1;

FIGURE 3 is a view similar to FIGURE 1 showing the coiled spring in flexed condition;

FIGURE 4 is a view similar to FIGURE 1 of an alternative connector; and

FIGURE 5 is an end view on the line 5—5 of FIGURE 4.

As shown in FIGURES 1 to 2, the connector of the invention is applied to a coiled spring indicated generally at 10 which comprises a helical coil of spring wire wound so that adjacent turns are biased axially toward each other. The end turns of the coil are cut off to provide a coil of the desired length and do not extend beyond the coil itself.

Connectors are secured to each end of the coil through which the coil is loaded. As shown, each connector includes a bar or strap 11 having a bearing member 12 at one end thereof for connection to load applying members. At its other end the bar or strap is reduced, as shown at 13, to a width approximately equal to the inner diameter of the coiled spring and is formed in its opposite sides with partial grooves 14 which will receive the end turn of the coil. The grooves terminate in relatively thin shoulders or lips 15 at the outer end of the connector which overlie the end turn of the coil but are of such a thickness and shape that they will not engage the next adjacent turn. The connector may be provided with a stop shoulder 16 against which the end turn of the coil will lie and the fitting may be threaded into the coil sufficiently far that the extreme end of the coil as shown at 17 will engage one side of the bar or strap 11 to limit threading of the connector into the coil. This engagement will also tend to prevent relative turning of the connector and coil as the spring is flexed in use.

In use of the spring as shown when a compressive load is applied between the bearing fittings 12, as indicated by the arrows in FIGURES 1 and 2, the coil will flex laterally into an arcuate shape as illustrated. At this time the adjacent turns of the coil at the outer or convex portion of the spring tend to separate, while the inner or concave turns are pressed more tightly together. The outer turns of the coil, as best seen in FIGURE 3, can move freely away from the end turn, which is secured in the connector without any rubbing or other interference from the connector. At the inner edge of the coil the turn adjacent to the end turn will simply bear against the end turn without any rubbing over or interference with the connector. The coil may thus function freely in a desired manner without producing any wear due to rubbing or without creating any friction which would affect the spring characteristics.

FIGURES 4 and 5 illustrate an alternative construction including a coiled spring 20 similar to the coiled spring 10 of FIGURES 1 to 3. In this case the connector comprises a bar or strap 21 formed with a bearing member 22 at the outer end thereof. At its inner end the bar or strap is widened to a dimension greater than the external diameter of the coil and is formed in its outer edges with axially facing grooves 23 which are shaped to receive the end turn of the coil over a portion of its circumference in excess of 180°. The grooves terminate axially in relatively thin external lips 24 and in some relatively thin internal lips 25 which clear the next adjacent turn of the coil.

As best seen in FIGURE 5, the connector is widened to provide feet 26 extending outwardly from the sides thereof and through which the lower groove extends. This will not only provide stability for the coil 20 but also the feet will serve as stops to engage the end of the coil, as indicated at 27 in FIGURE 5, to limit threading of the connector into the coil and to retain the coil and connector in the desired relationship during operation.

Each of the connectors, as shown in FIGURES 4 and 5, may be made of two stampings or the like, as indicated at 21a and 21b in FIGURE 5. These stampings may be welded or otherwise suitably secured together in face to face relationship to form the completed connector. Alternatively the connector could be cast in the shape shown.

In use the construction of FIGURES 4 and 5 will function in the same manner as that of FIGURES 1 to 3. The end turn of the coil is securely gripped in the grooves 23 so that when a compressive load is applied between the bearing members 22 the coil will flex. During flexing, however, the turn of the coil adjacent to the end twin will not engage or rub against any of the lips 24 or 25, so that wear of the coil will be avoided and the spring will function freely in the intended manner without interference due to friction.

While two embodiments of the invention have been shown and described in detail, it will be understood that these are illustrative only and are not to be taken as a definition of the scope of the invention, reference being had for this purpose to the appended claims.

What is claimed is:

1. An end connector in combination with a coil spring in which the coils are of uniform diameter and are biased axially together and which flexes laterally under compressive load, the end connector comprising a fitting formed at one end with a bearing member and at its other end with a groove to receive tightly the end turn of the spring, the groove terminating at said other end of the member in a thin lip extending to a point radially short of the point of engagement of the end turn and the next adjacent turn and clearing the next adjacent turn.

2. The end connector of claim 1 in which the bearing member lies radially beyond an extension of the outer surface of the coil spring when it is in unloaded condition.

3. The end connector of claim 1 in which the other end of the connector is narrower than the diameter of the coil spring and the groove is discontinuous and engages the end coil at diametrically opposite points only.

4. In combination with a coil spring in which the coils are biased axially together and which flexes laterally under compressive load, an end connector comprising a generally flat fitting thinner than the internal diameter of the coil, the fitting being formed at one end with axially facing openings to receive diametrically opposite portions of the end turn of the coil, said openings embracing the end turn throughout more than 180° of the circumference of the wire forming the end turn and terminating in thin lips which clear the next adjacent turn.

5. An end connector in combination with a coil spring in which the coils are of uniform diameter and are biased axially together and which flexes laterally under compressive load, the end connector comprising a fitting formed at one end with a bearing member and at its other end with a groove to receive tightly the end turn of the spring, the groove terminating at said other end of the member in a thin lip extending to a point radially short of the point of engagement of the end turn and the next adjacent turn and clearing the next adjacent turn, said groove facing axially of the coil and embracing more than 180° of the circumference of the wire forming the end turn.

References Cited by the Examiner

UNITED STATES PATENTS

| | | | |
|---|---|---|---|
| 326,721 | 9/1885 | Grandall | 267—1 |
| 1,348,522 | 8/1920 | Sweiven. | |
| 1,361,523 | 12/1920 | Jacobs. | |
| 1,878,128 | 9/1932 | Griswold. | |
| 2,296,175 | 9/1942 | Morkoski. | |
| 2,702,082 | 2/1955 | Wolf | 267—74 X |

ARTHUR L. LA POINT, *Primary Examiner.*